Aug. 12, 1947.  T. H. CHILTON ET AL  2,425,508
DUST SEPARATOR, ESPECIALLY FOR CARBURETOR AIR INTAKE DUCTS
Filed Jan. 23, 1945
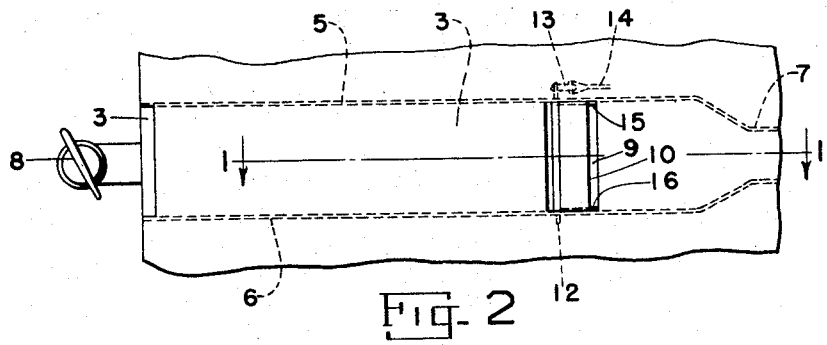
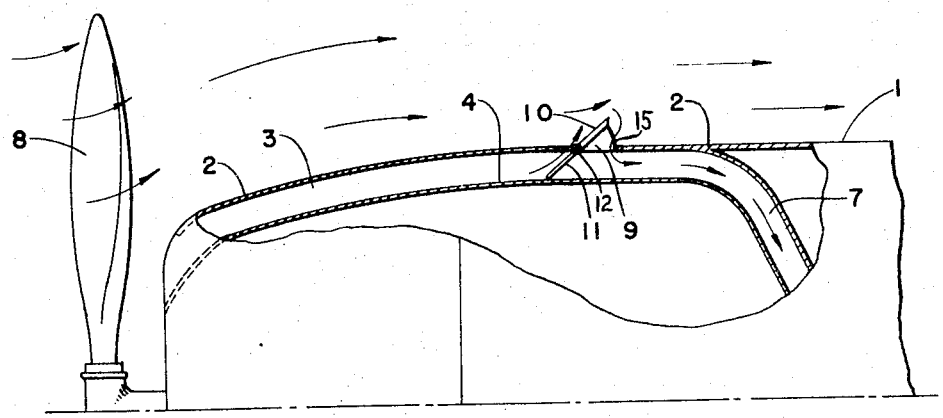
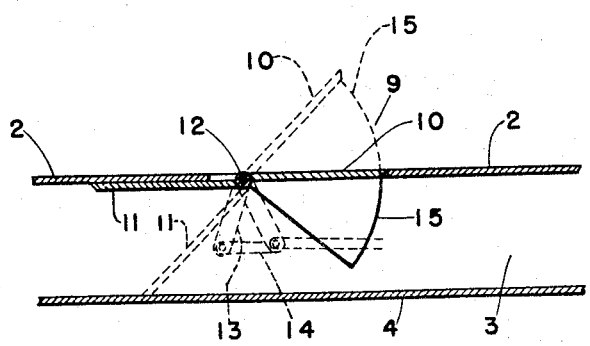
Inventors
THOMAS H. CHILTON
CHARLES E. LAPPLE
By
Attorney Patented Aug. 12, 1947

2,425,508

UNITED STATES PATENT OFFICE 2,425,508

DUST SEPARATOR, ESPECIALLY FOR CARBURETOR AIR INTAKE DUCTS

Thomas H. Chilton and Charles E. Lapple, Wilmington, Del., assignors to the United States Government, as represented by the Secretary of the Navy Application January 23, 1945, Serial No. 574,152

2 Claims. (Cl. 123—119)

This invention relates to dust separators of the type adapted to be used in the air intake systems of internal combustion engines mounted in vehicles.

A large number of different types of dust separators adaptable to become part of the air intake systems of automobile or other vehicular internal combustion engines have been used. Many of these have been successful in accomplishing their purpose under the particular conditions for which they were designed. Aircraft engines operate under such a diversified variety of conditions that the conventional types of dust separators do not meet the requirements of a good separator under all operating conditions. An example of one of the worst conditions that aircraft engines must operate under is during take-off from sandy or dusty fields as are found in Africa. Military aircraft in particular often take off in large numbers substantially at the same time or at closely spaced intervals. While the field may be dust free as far as the first plane is concerned, it stirs up such a cloud of dust and sand that the air is full of it, and the succeeding planes must fly through this dust and that raised by other preceding planes in the group. The concentration of abrasive dust particles is so high that they can be removed only partially by conventional separators; thus they enter the engine through the air intake system and cause very rapid wear of the moving parts of the engine. A similar problem exists for example when automobiles are raced on dirt tracks. We have devised a dust separator which is very effective in removing the dust from air taken in by the engines of rapidly moving vehicles such as aircraft, racing automobiles or the like. The dust removal is accomplished by the centrifugal effect of twice reversing the direction of the air flowing into the air intake system.

It is therefore the object of our invention to provide a novel and improved dust separating device for the air intake systems of engines mounted in vehicles which are adapted to be driven at high speeds.

Other objects will become apparent as the description proceeds in connection with the accompanying drawings wherein:

Fig. 1 is a side elevation, partly in section along the line 1—1 of Fig. 2 of an embodiment of the separator as installed in an airplane;

Fig. 2 is a top plan view of the structure shown in Fig. 1; and

Fig. 3 is an enlarged sectional view of the damper and duct shown in Fig. 1.

As shown, the forward portion of the fuselage 1 terminates and is faired to the engine cowl 2 which encloses a radial type engine (not shown). A longitudinal air duct 3 is formed partly by the cowl surface and partly by a spaced partition wall 4 substantially paralleling the cowl surface. The side walls 5 and 6 of the duct are shown in Fig. 2 in dotted lines, and extend from the cowl surface to the partition wall 4. The duct 3 terminates in a portion 7 which is formed separately from the cowl surface and extends inwardly towards the carburetor (not shown), into which the air from the portion 7 flows.

The forward portion of the duct 3 extends to the front of the cowl, just behind the propeller 8 where it is open to the air blast from the propeller and that resulting from the forward motion of the airplane. Thus the duct forms an air ram delivering air to the carburetor. It is to be understood that the cowl is the equivalent of the hood of the engine compartment if the invention is used in an automobile or the like.

At a part of the cowl substantially spaced from its forward end, an opening 9 is made in that portion of the cowl surface which forms the outer wall of the duct 3. A baffle having a rear vane 10 and a forward vane 11 which are preferably slightly displaced as shown clearly in Fig. 3, is pivotally mounted upon a shaft 12 or the like for rotation about a horizontal transverse axis. The baffle has two positions, one as shown in Fig. 1 where it blocks the duct 3, and second as shown in full lines in Fig. 3 where it closes the opening 9 and leaves the duct 3 unobstructed. A lever 13 is affixed to one end of the shaft 12 where it protrudes through the side wall 5 of the duct, and a rod or link 14 is pivotally connected to the outer end of the lever and extends to the cockpit of the airplane where the operator can operate it to open or close the baffle. It is to be understood that the means shown for opening or closing the baffle is illustrative only and that any suitable device may be used. The vane 10 has a pair of downwardly extending side wall wings 15 and 16 which lie alongside the side walls 5 and 6 of the duct 3 when the baffle is closed as in Fig. 3, but which connect the sides of the vane 10 to the side edges of the opening 9 when the baffle is turned to the position of Fig. 1 or the position shown in dotted lines in Fig. 3. These wings 15 and 16 prevent air from flowing around the sides of the vane 10 and into the duct 3 when the vane is in the open position of Fig. 1.

The shaft 12 upon which the baffle is pivoted is slightly spaced from the forward edge of the opening 9 as clearly shown in Figs. 2 and 3, for a purpose to be described.

Thus the baffle has the two positions shown, wherein it either permits the flow of air from the forward end of duct 3 all the way to the portion 7, or blocks the duct so that the air entering its forward end cannot pass the vane 11.

When the airplane is on the ground, and it is desired to separate dust from the air entering the air intake, the baffle is positioned as shown in Fig. 1, and the flow of the air is as indicated by the arrows in that figure. That air which enters the duct 3 at its forward end is directed out from the duct through the opening 9 between its forward edge and the shaft 12. The air passing over the cowl surface from the propeller blast and from the flow resulting from the forward motion of the airplane is moving at high speed relative to the airplane, and towards its rear. The air pressure in the portion 7 of the duct is low because of the fact that air is being sucked therefrom by the engine, and air is drawn into the duct 3 through that part of the opening 9 which lies behind the shaft 12 as shown by the arrows of Fig. 1. In order for the air to enter the duct 3 in this manner it has its direction of flow reversed twice, since it changes from a rearward flow to a forward flow, and then to a rearward flow again. Since the air is moving at such a high velocity past the vane 10 when its direction is reversed, the particles of dust and dirt continue their path towards the rear because of their relatively greater mass, and they are thereby effectively separated from the intake air. The air which has entered the duct 3 forward of the baffle is discharged therefrom as previously described, between the forward edge of opening 9 and the shaft 12, from where it passes over the outer surface of the vane 10. This air, which has been discharged from the duct 3, has the effect of reducing the turbulence of the outer air where it passes over the protruding vane 10, thus making more effective the reversal of the air flow when it changes direction to enter the opening 9.

When the baffle is moved to the position shown in full lines in Fig. 3 there is no dust separating effect and the duct is unobstructed. This is the normal position for the baffle when the airplane is airborne and there is no dust in the air.

The invention may be embodied in other specific forms without departing from the spirit or essential characteristics thereof. The illustrated embodiment is therefore to be considered as merely illustrative and not restrictive, the scope of the invention being indicated by the appended claims rather than by the foregoing description, and all changes which come within the meaning and range of equivalency of the claims are therefore intended to be embraced therein.

We claim:

1. In a dust eliminating air intake system for an internal combustion engine of a high speed vehicle, an air duct extending longitudinally of the vehicle having a first air intake opening at the forward end thereof, an outer wall of said duct being located in the airstream of the vehicle, a second opening in said duct located in said outer wall, a pivot extending laterally across said second opening and located behind the forward edge of said opening a distance substantially less than the depth of said duct and forwardly of the rear edge of said second opening a distance at least equal to the depth of said duct, a baffle member for said second opening pivoted on said pivot having a vane extending forwardly of said pivot and within said duct a distance substantially greater than the depth of said duct and a rearward vane extending a distance at least equal to the rearward portion of said second opening, and means for controllably shifting said baffle member between a closing position substantially coinciding with the outer wall and a position with the forwardly extending vane forming an acute angle with the wall opposite the outer wall to divert the air through the forward portion of said second opening and with the rear vane extending into the airstream to open the rear portion of the opening to a reverse flow of dust freed air into said duct.

2. In a dust eliminating air intake system for an internal combustion engine of a high speed vehicle, an air duct extending longitudinally of the vehicle having a first air intake opening at the forward end thereof, an outer wall of said duct being located in the airstream of the vehicle, a second opening in said duct located in said outer wall, a pivot extending laterally across said second opening and located behind the forward edge of said opening a distance substantially less than the depth of said duct and forwardly of the rear edge of said second opening a distance at least equal to the depth of said duct, a baffle member for said second opening pivoted on said pivot having a vane extending forwardly of said pivot and within said duct a distance substantially greater than the depth of said duct and a rearward vane extending a distance at least equal to the rearward portion of said second opening, said rearward vane having triangular wings at its opposite sides extending normally thereto into said duct, and means for controllably shifting said baffle member between a closing position substantially coinciding with the outer wall and a position with the forwardly extending vane forming an acute angle with the wall opposite the outer wall to divert the air through the forward portion of said second opening and with the rear vane extending into the airstream to open the rear portion of the opening to a reverse flow of dust freed air into said duct.

THOMAS H. CHILTON.
CHARLES E. LAPPLE.

REFERENCES CITED

The following references are of record in the file of this patent:

UNITED STATES PATENTS

| Number | Name | Date |
|---|---|---|
| 2,173,893 | Wermich | Sept. 26, 1939 |
| 1,962,685 | Green | June 12, 1934 |
| 1,553,249 | LeGrain | Sept. 8, 1925 |
| 697,493 | Kershner | Apr. 15, 1902 |
| 2,286,803 | Holthouse | June 16, 1942 |
| 1,870,809 | Handy | Aug. 9, 1932 |
| 2,362,346 | Blake | Nov. 7, 1944 |
| 2,407,194 | Vokes | Sept. 3, 1946 |

FOREIGN PATENTS

| Number | Country | Date |
|---|---|---|
| 381,956 | Germany | Sept. 27, 1923 |